May 11, 1926.
E. M. ORTON
1,583,991
ROAD GRADER
Filed March 5, 1925
4 Sheets-Sheet 1
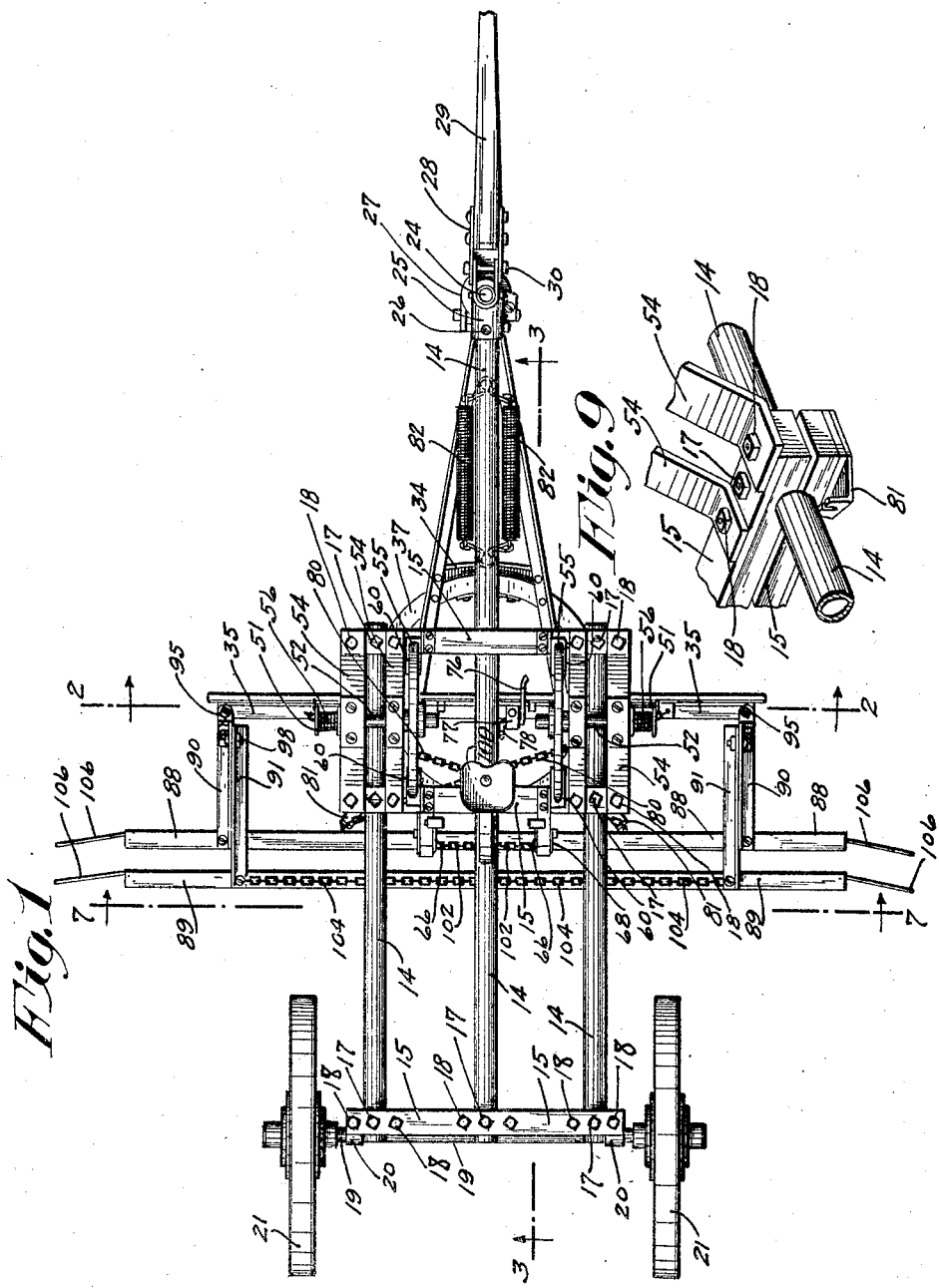
Inventor
Edward M. Orton
By his Attorneys May 11, 1926. 1,583,991
E. M. ORTON
ROAD GRADER
Filed March 5, 1925  4 Sheets-Sheet 2
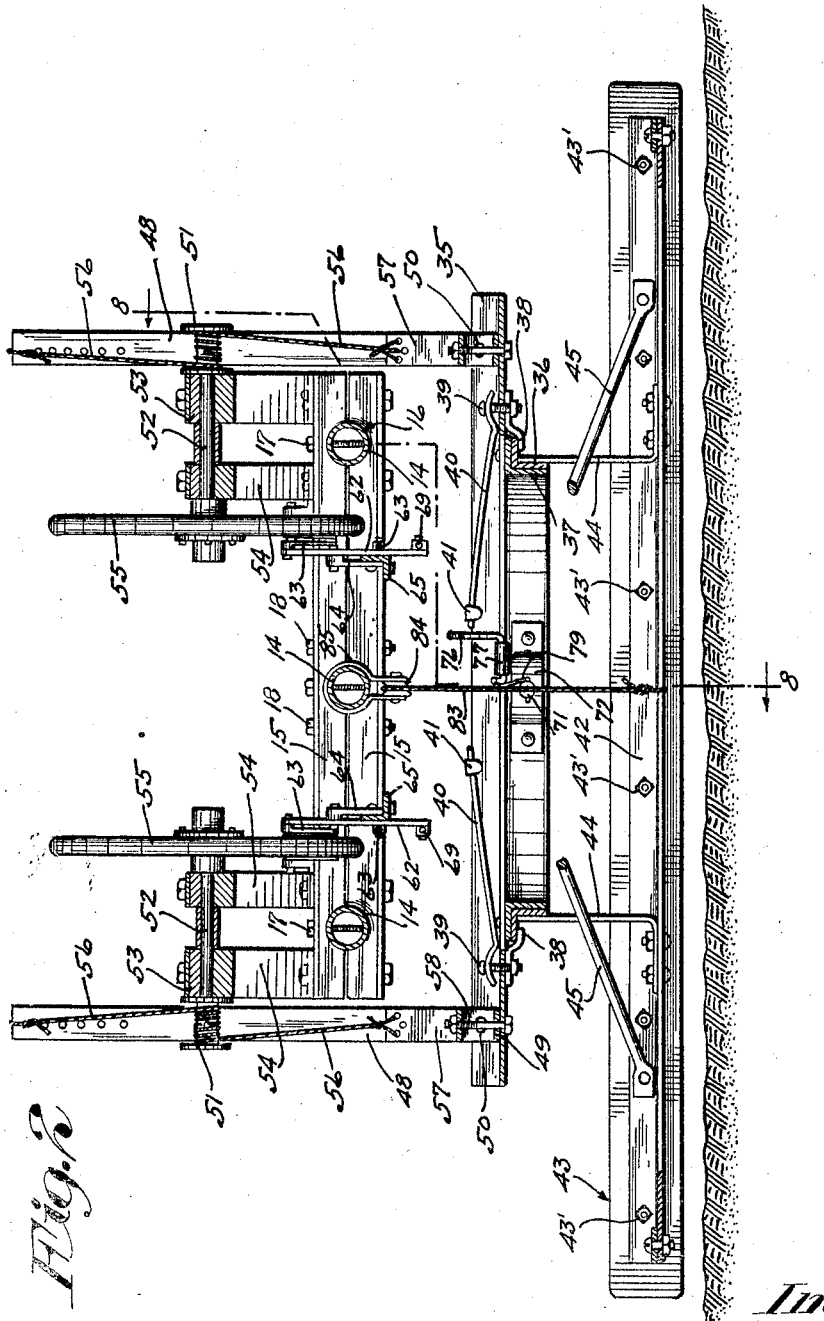
Inventor
Edward M. Orton
By his Attorneys May 11, 1926.
E. M. ORTON
1,583,991
ROAD GRADER
Filed March 5, 1925    4 Sheets-Sheet 3
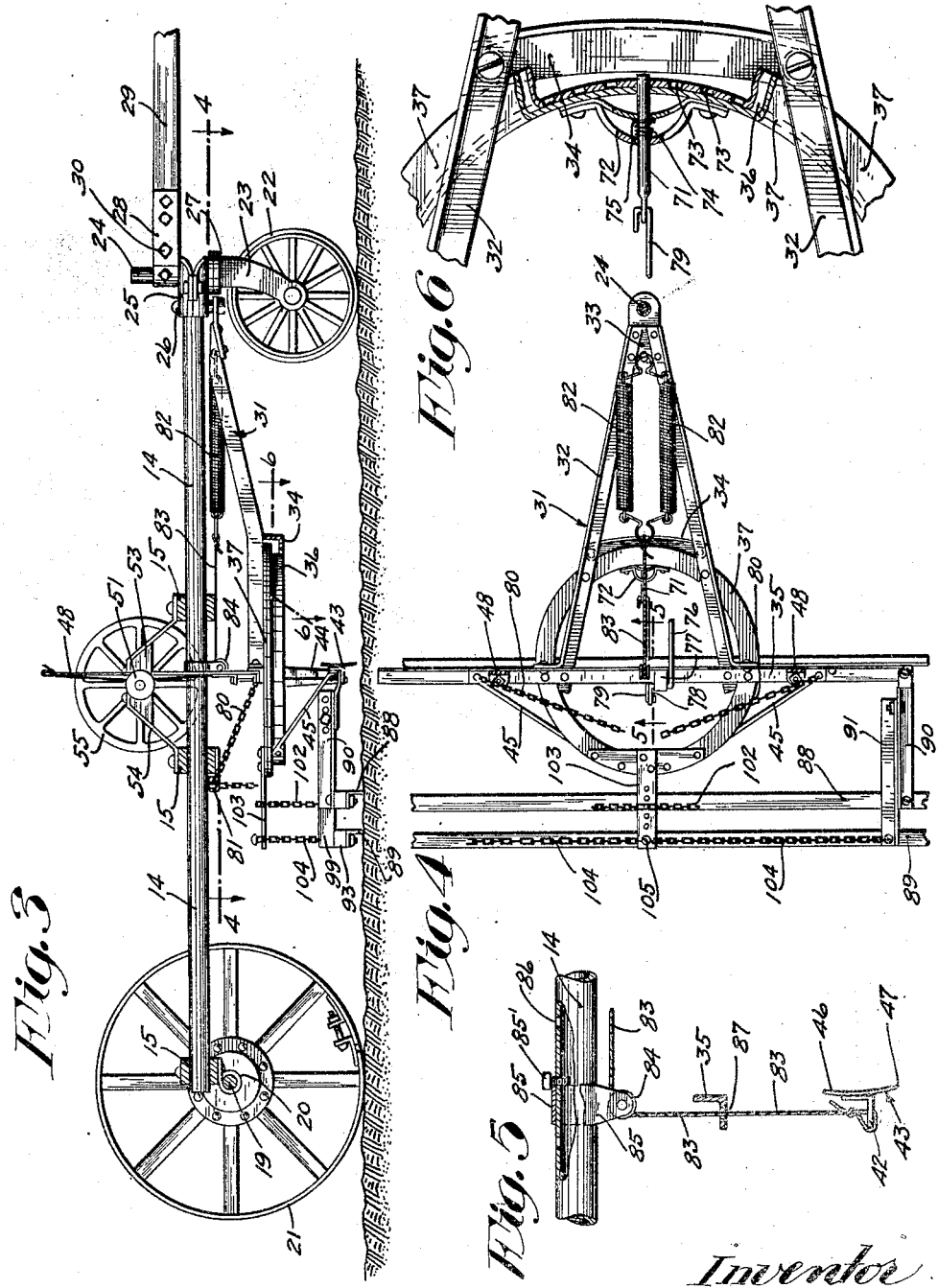
Inventor
Edward M. Orton
By his Attorneys

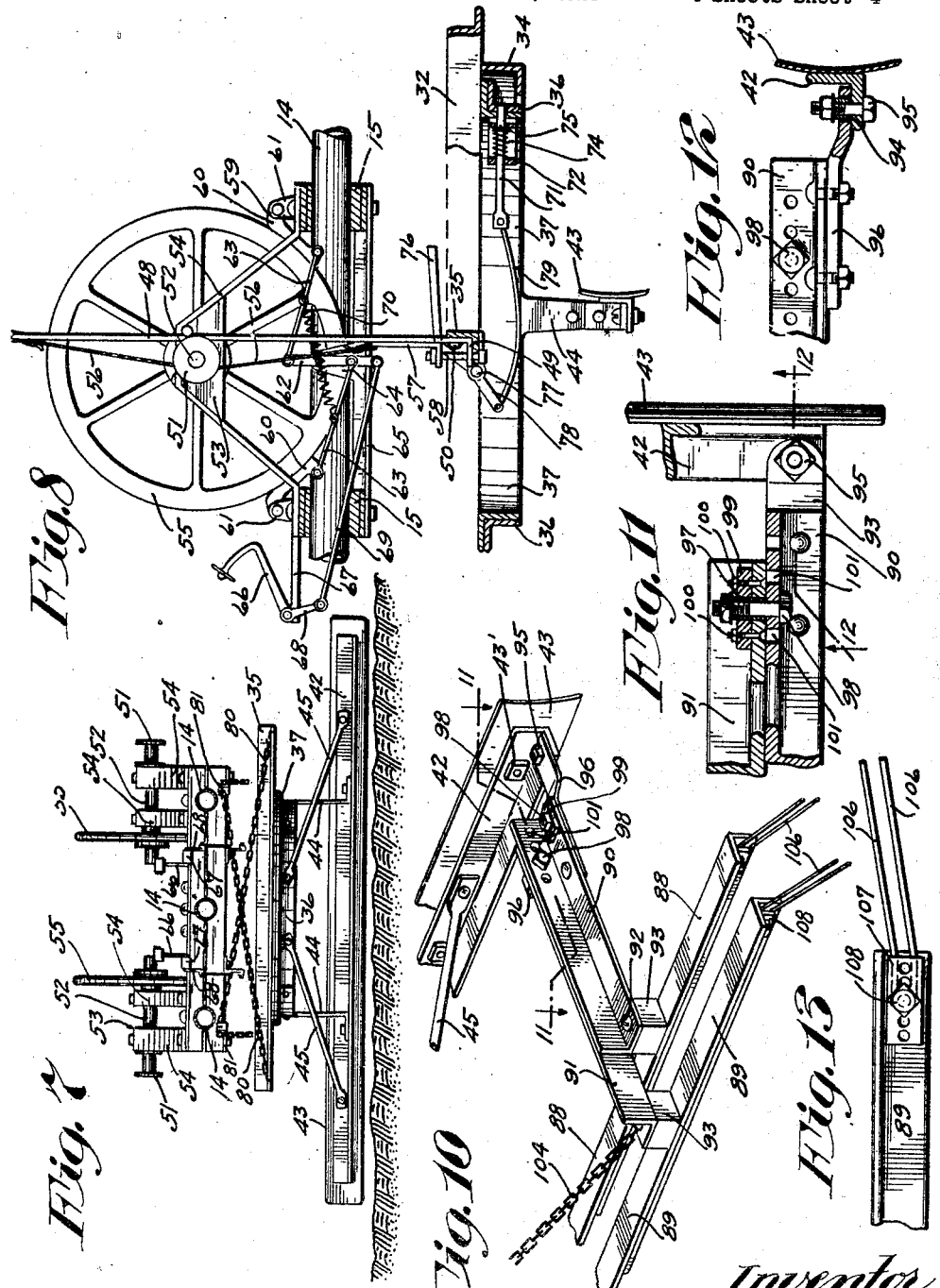

Patented May 11, 1926.

1,583,991

UNITED STATES PATENT OFFICE.

EDWARD M. ORTON, OF MINNEAPOLIS, MINNESOTA.

ROAD GRADER.

Application filed March 5, 1925. Serial No. 13,362.

My present invention relates to road graders and has for its object to improve the same in the several particulars hereinafter noted.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the improved road grader;

Fig. 2 is a view principally in transverse vertical section taken substantially on the line 2—2 of Fig. 1, on an enlarged scale;

Fig. 3 is a view partly in right side elevation and partly in longitudinal central section, taken on the line 3—3 of Fig. 2, and with some parts removed;

Fig. 4 is a view partly in plan and partly in horizontal section, taken on the line 4—4 of Fig. 3, with some parts broken away;

Fig. 5 is a fragmentary detail view with some parts sectioned on the line 5—5 of Fig. 4, on an enlarged scale.

Fig. 6 is a fragmentary detail view partly in plan and partly in horizontal section, taken on the line 6—6 of Fig. 3, on an enlarged scale;

Fig. 7 is a transverse vertical section, taken on the line 7—7 of Fig. 1, with some parts removed;

Fig. 8 is a view partly in right side elevation and partly in longitudinal vertical section, taken on the irregular line 8—8 of Fig. 2;

Fig. 9 is a fragmentary perspective view of a portion of the right side of the frame at the intermediate cross-tie bar;

Fig. 10 is a fragmentary perspective view of the right end portions of the mold board and drag bars and parts associated therewith;

Fig. 11 is a detail view partly in plan and partly in horizontal section taken on the line 11—11 of Fig. 10, on an enlarged scale;

Fig. 12 is a fragmentary detail view with some parts sectioned on the line 12—12 of Fig. 11; and Fig. 13 is a rear elevation of the right-hand end portion of one of the drag bars and attached rock remover.

The frame of the road grader comprises longitudinally extended laterally spaced side and intermediate tubular bars 14 rigidly connected by front, rear and intermediate cross-tie bars 15, the latter of which is located relatively close to said front cross-tie bar. The intermediate frame bar 14 is longer than the side bar 14 and extends materially forward thereof.

Each cross-tie bar 15 comprises upper and lower members, between which the frame bars 14 extend, and which members have in their opposing faces co-operating half-round half seats 16 in which said frame bars are mounted. The seats 16 are so formed as to hold the members of the cross-tie bars 15 laterally spaced and said cross-tie bars are rigidly secured to the frame bars 14 by nut-equipped bolts 17 which extend through aligned bores in said bars 14 and 15. The members of the cross-tie bars 15 are further secured to the frame bars 14 by pairs of nut-equipped bolts 18 which extend through aligned bores in said members at each side of the respective frame bars 14, and frictionally and adjustably clamp said members onto the frame bars 14.

A fixed axle 19 is mounted in bearings 20 on the under side of the rear cross-tie bar 15 and has journaled thereto a pair of rear wheels 21. The front end of the frame is supported on a caster wheel 22 journaled in a bearing fork 23 having an upstanding trunnion 24 swivelled in a longitudinally split bearing head 25 frictionally clamped onto the front end of the intermediate frame bar 14 by a nut-equipped bolt 26. An anti-friction bearing 27 is interposed between the bearing fork 23 and bearing head 25.

Rigidly secured to the trunnion 24, above the bearing head 25, is a pole coupling 28 which holds said head against lifting movement on said trunnion. A pole 29 is attached to the pole coupling 28 for imparting angular steering movement to the caster wheel 22 and is pivoted at 30 to said pole coupling for vertical swinging movement. To this pole 29 may be attached a truck, tractor, horses or other means for drawing the road grader.

A horizontally disposed supplemental frame 31 located under the main frame has its front end pivotally attached to the lower end of the bolt 26 which attaches said supplemental frame to the main frame for horizontal swinging movement in respect thereto, and with sufficient freedom to permit the rear end of said supplemental frame to be raised and lowered. This supplemental frame, as shown, comprises a pair of rearwardly diverging side bars 32 rigidly connected by a front anchor plate 33, an intermediate transverse cross-tie bar 34 and a rear transverse cross-tie bar 35. The end portions of the rear cross-tie bar 35 extend materially outward of the side bars 32. It will be noted that the members of the supplemental frame 31 are formed from commercial angle bars.

Supported from the under side of the supplemental frame 31 is a horizontally disposed turntable 36 formed from a commercial angle bar, the horizontal flange of which extends outward and the vertical flange of which extends downward. This turntable 36 is rotatably mounted around the depending flange of an annular track 37 formed from a commercial angle bar, the horizontal flange of which extends over the corresponding flange of said turntable. The horizontal flange of the track 37 is rigidly secured to the side bars 32 of the supplemental frame 31 and to its rear cross-tie bar 35 at diametrically opposite points. This track 37 is located rearward of the intermediate cross-tie bar 34 and its axis slightly forward of said rear cross-tie bar and at the longitudinal center thereof.

Clamps 38 are secured to the horizontal flange of the rear cross-tie bar 35 at diametrically opposite points by a pair of nut-equipped bolts 39 with freedom for raising and lowering movements and which clamps underlie the horizontal flange of the turntable 36 and support said turntable. A pair of transversely extended foot levers 40 are intermediately fulcrumed on the horizontal flange of the rear cross-tie bar 35 and their short or outer ends have apertures through which the bolts 39 extend and connect said levers thereto. The long or inner ends of the foot levers 40, when depressed, raise the clamps 38 and thereby frictionally hold the horizontal flanges of the turntable 36 and track 37 in contact to secure the turntable 36 against rotation. Said foot levers 40, when raised, release the clamp 38 and thereby permit the turntable to drop out of frictional engagement with the horizontal flange of the track 37 for free rotation. Hook-like lock lugs 41 on the vertical flange of the rear cross-tie bar 35 are arranged to hold the inner or long ends of the foot levers 40, when depressed, to secure the clamps 38 set and the turntable 36 against rotation.

Extending transversely under the turntable 36 is a long horizontal transversely extending frame 42 for holding a scraper 43. This frame 42 is in the form of an angle bar held suspended from the turntable 36 by a pair of arms 44 and a pair of rearwardly converging brace rods 45. These arms 44 are rigidly secured to the turntable 36 at diametrically opposite points and to the horizontal flange of the frame 42 which extends rearward. The brace rods 45 are rigidly secured to the upright flange of the frame 42, outward of the arms 44, and to the turntable 35, rearward of the arms 44. The scraper 43 is in the form of a blade that is transversely shaped to form a mold board 46 and a share or cutting edge 47, and which scraper is detachably secured to the front face of the vertical flange of the frame by a plurality of long spaced nut-equipped bolts 43'.

The following connections are provided for raising and lowering the scraper 43 and angularly adjusting the same in a vertical plane to wit: a pair of upright hanger bars 48 having rearwardly turned feet 49 that rest on the horizontal flange of the supplemental frame bar 35 and which uprights are secured each by a single rivet 50 to the vertical flange of said bar. These hanger bars 48 project forward of a pair of axially spaced spools 51 and between the flanges thereof, and which spools are secured to the outer ends of a pair of transverse shafts 52. Each shaft 52 is journaled in bearings 53 secured in a pair of laterally spaced yoke-like bars 54 that rest on the front and intermediate transverse tie bars 15 and are secured thereto by the nut-equipped bolts 18. On the inner end of each shaft 52 is rigidly secured a relatively large hand wheel 55 for rotating said shaft. A cable 56 is intermediately secured to each spool 51 and the end portions thereof reversely wound thereon and one end of said cable is secured to the upper end of the respective hanger bar 48, and the other end thereof is attached to a turnbuckle 57, the adjusting member of which is in the form of a nut-equipped bolt 58 which extends through aligned bores in the horizontal flange of the cross-tie bar 35 and foot 49 of said hanger bar. It may be here stated that the bores in the feet 49 are relatively large so that the hanger bars 48 have a very limited movement on their rivet connections 50 to provide slight flexibility between the cross-tie bar 35 and hanger bars 48. Preferably, the bodies of the spools 51 will be provided with spiral grooves for guiding the cables 56.

Friction brakes 59 are provided for independently holding the hand wheels 55 and each thereof comprises a pair of circumferentially spaced shoes 60 arranged to engage the periphery of one of said wheels. Opposite ends of the shoes 60 of each pair are pivoted to bearings 61 on the front and intermediate cross-tie bars 15, and their inner ends are connected by a pair of connecting rods 63 to opposite ends of a vertically disposed intermediately fulcrumed lever 62. Each lever 62 is pivoted to a bearing 64 on an angle bar 65 which extends between and is secured to the intermediate and front cross-tie bars 15. This lever 62 may be actuated by a foot pedal 66 mounted on a bearing 67 secured to the intermediate cross-tie bar 15 and has a depending crank arm 68 connected by a link 69 to the lower or long end of said lever 62 below the respective connecting rod 63. A coil spring 70, the ends of which are anchored to the two connecting rods 63 at their intermediate portions, yieldingly holds the brake shoes 60 set. To release these brake shoes 60, it is only necessary to press downward on the foot pedal 66.

To lock the turntable 36 in different rotative positions, I provide a latch comprising a bolt 71 slidably mounted in a bracket 72 secured to the internal face of the vertical flange of the track 37 at the front thereof. This bolt 71 is arranged to work through a bore in the track 37 and be projected into any one of a plurality of circumferentially spaced holes 73 in the vertical flange of the turntable 36. A coiled spring 74 encircling the latch bolt 71 is compressed between a shoulder 75 on said bolt and the bracket 72 and yieldingly holds said bolt projected. To release the latch bolt 71, I provide a foot pedal 76 pivoted at 77 to the frame bar 35 and having a crank arm 78 connected by a link 79 to the latch bolt 71. Obviously, by depressing the foot pedal 76, the latch bolt 71 may be withdrawn from the respective hole 73 to release the turntable 36.

To limit the downward movement of the scraper 43, and prevent the same from cutting too deep, and also for limiting the endwise movement of the scraper 43, which is only sufficient to give flexibility to the road grader, I connect said scraper to the supplemental frame bar 35 by a pair of crossed chains 80. The crossed chains 80, at one of their ends, are permanently secured to the outer ends of the supplemental frame bar 35, and, at their other ends, are adjustably and detachably held by claw-like anchors 81 secured to the outer end portions of the intermediate cross-tie bar 15, and with which anchors the links of said chains may be interlocked to vary the operative lengths of said chains.

A pair of counterbalancing springs 82 for the supplemental frame 31, turntable 36 and scraper 43 and all the other parts carried by said frame are anchored, at their front ends, to the front end of the frame 31 and are connected to the frame 42 by a cable 83 at the longitudinal center thereof, and its intermediate portion runs over a guide sheave 84 journaled in a collarlike bearing 85 which extends around the intermediate frame bar 14. This collar bearing 85 is held against forward sliding movement under the action of the springs 82 by a bolt 85′ adapted to be screwed into any one of a plurality of longitudinally spaced tapped holes 86 in said frame member 14. By longitudinally adjusting the bearing collar 85 on the frame member 14, the tension of the springs 82 may be varied at will. In the adjustment of the bearing collar 85, as shown in Fig. 5, the vertical portion of the table 83 extends through a hole 87 in the supplemental frame bar 35. The purpose of these counterbalancing springs 82 is to relieve the pull on the hand wheels 55 and thereby make the raising or lowering movements of the scraper 43 relatively easy.

Arranged to follow the scraper 43 is a road drag comprising front and rear drag beams 88 and 89, respectively, and, as shown, each thereof is formed from a commercial angle bar the vertical flange of which is turned downward and the horizontal flange of which is turned rearward. The front drag beam 88 is attached to the frame 42 by a pair of draft bars 90 and the rear drag beam 89 is attached to the draft bars 90 by a pair of draft bars 91. Said draft bars 90 and 91, as shown, are formed from commercial angle bars and the two draft bars at each end of the drag are arranged with their vertical flanges turned upward and back to back and their horizontal flanges are turned away from each other. These draft bars 90 and 91 are pivotally secured to the drag beams 88 and 89, respectively, by vertical bolts 92 which extend through bores in the horizontal flanges of said drag beams and draft bars. Spacing blocks 93 are interposed between the horizontal flanges of the drag beams 88 and 89 and the draft bars 90 and 91, respectively, and are held in place by the bolts 92 which extend therethrough.

The draft bars 90 are attached to the frame 42, to permit raising, lowering and endwise movements of the drag beam 88, as well as angular movements thereof in a vertical plane, by vertical spacing sleeves 94 secured to the horizontal flange of said frame by nut-equipped bolts 95 and which sleeves pass loosely through seats in connecting metal straps 94 rigidly secured to said draft bars. The draft bars 91 are located between the draft bars 90 and pivotally attached thereto by horizontal spacing sleeves 97 secured to the vertical flanges of the draft bars 90 by nut-equipped bolts 98, and which spacing sleeves extend through seats in the vertical flanges of the draft bars 91 and bearing blocks 99 secured by nut-equipped bolts 100 to the inner faces of said vertical flanges.

This connection of the draft bars 91 to the draft bars 90 permits the drag beam 89 to rise and fall independently of the drag 88 and with a sufficient flexibility to angularly move in a vertical plane, and the lateral engagement of the draft bar 90 and 91 with each other will cause said drag beams to move endwise with each other. The drag beam 89 may be set different distances back of the draft beam 88 by adjusting the bolts 98 in different bores 101 formed in the horizontal flanges of the draft bars 90 and longitudinally spaced in respect thereto.

To raise and lower the drag beams 88 and 89 with the scraper 43, a chain 102 has its ends anchored to the drag beam 88 equal distances from the ends of said drag beam and with its intermediate portion loosely extended over a rearwardly projecting finger 103 on the turntable track 37. As the draftbars 91 extend over the drag beam 88, the draft beam 89 will be raised and lowered with said drag beam 88.

Endwise movement is imparted to the drag beam 89, during the adjustment of the turntable 36, by a chain 104, the ends of which are secured to the bolts 92 which secure the draft arms 91 to said drag beam and its intermediate portion is secured to the finger 103 over which it passes by as bolt 105.

A pair of vertically spaced outwardly and upwardly inclined spring steel fingers 106 is secured by a clamping plate 107 and a nut-equipped bolt 108 to the vertical flange of each drag beam 88 and 89 and to each of the ends thereof. The purpose of these fingers 106 is to pass through the surplus road material, collected by the scraper 43 and drag beams 88 and 89 and moved outward of the ends thereof, and remove therefrom rocks, lumps of dirt or other objects and move the same further outward of the road material collected by said scraper and drag beams.

A spring-supported seat 109 for the operator is secured to the intermediate transverse tie bar 15.

Operation.

The operation of the above described road grader and drag may be briefly described as follows: The operator, while seated on the seat 109, is in a convenient position to release the friction brakes 59 which hold the hand wheels 55 and operate said hand wheels to adjust the scraper 43 and drag beams 38 and 39. He can also release the turntable 36 by operating the foot pedal 76 to retract the latch bolt 71 and move the levers 40 out of engagement with the lock lugs 41 to release the clamps 38.

The scraper 43 and drag bars 88 and 89 may be raised, lowered or angularly adjusted in a vertical plane by means of the hand wheels 55. By holding the hand wheels 55 with the friction brakes 59, which are operative on the peripheries thereof, said wheels are securely held wherever set to closely adjust the scraper 43. The latch bolt 71 positively holds the turntable 36 where set and which turntable positively holds the scrapers 43 and drag beams 88 and 89 against swinging or turning movements over the face of the road bed. The hanger bars 48 which are positively held in different vertical endwise adjustments by the reversely extended ends of the cables 36 and which hanger bars positively hold the scraper 43 where set so that the same will not jump under scraping action and thereby gouge or dig into the road bed. The caster wheel 22 permits the road grader to be turned on a relatively short radius. The construction of the frame makes a very rigid structure that will not wrap or twist under the action of the road grader. If the operator desires to make a deep cut or break up a very hard surface in the road bed, the hand wheels 55 may be operated to cause the hanger bars 48 to force the scraper 43 onto the road bed and thereby lift the rear wheels 22 from said road bed so that the entire weight of the rear portion of the road grader is on the scraper 43. When using the road grader to scrape road material to a given side of the grader and when the operator desires to move a part of such material toward the reverse side of the road grader to fill a rut or hole, it is only necessary to release the latch bar 71 and then lift one end of the scraper 43 by operating the proper hand wheel 55 to cause the other end of the scraper 43, which is in contact with the road bed, to act as a pivot on which the scraper 43 will swing over the face of the road bed under the action of the advance movement of the road grader. This swinging movement of the scraper 43 will also swing the drag beams 88 and 89 and keep the same in parallel relation thereto.

From the above description, it is evident that the drag beams 88 and 89 will always remain parallel to the scraper 43 and to each other, and at the same time they are free to rise and fall independently of each other and of the scraper 43.

What I claim is:

1. A road grader comprising a truck, a scraper blade, a pair of spool-equipped shafts journaled on the truck, means for operating the shafts, a pair of hanger bars attached to the scraper blade, extending between the flanges of the spools and guided thereby and cables arranged to be intermediately wound on the spools and having their ends attached to the hanger bars above and below the spools.

2. A road grader comprising a truck, a vertically swinging supplemental frame attached to the truck, a scraper blade carried by the supplemental frame, a pair of spool-equipped shafts journaled on the truck, means for operating said shafts, a pair of hanger bars attached to the supplemental frame, extending between the flanges of the spools and guided thereby, and cables arranged to be intermediately wound on the spools and having their ends attached to the hanger bars above and below the spools.

3. A road grader comprising a truck, a vertically swinging supplemental frame attached to the truck, means for raising and lowering the supplemental frame, a turntable track on the supplemental frame, a turntable mounted on said track, a scraper blade carried by said turntable, and a pair of foot-actuated clamps for frictionally clamping the turntable on said track in different rotated positions.

4. The structure defined in claim 3 in further combination with means for securing said clamp set.

5. A road grader comprising a truck, a vertically adjustable supplemental frame attached to the truck, means for raising and lowering the supplemental frame, a turntable mounted on the supplemental frame, a scraper blade carried by the turntable, a drag beam, connections for causing the drag beam to follow the scraper blade and partake of the movements imparted thereto by the turntable, and flexible connections for raising and lowering the drag beam with the supplemental frame.

6. A road grader comprising a truck, a vertically adjustable supplemental frame attached to the truck, means for raising and lowering the supplemental frame, a turntable mounted on the supplemental frame, a scraper blade carried by the turntable, front and rear drag beams, connections for causing the drag beams to follow the scraper blade with freedom for independent raising and lowering movements in respect thereto and in respect to each other and partake of the movements imparted to the scraper blade by the turntable, and means including flexible connections for raising and lowering the drag beams with the supplemental frame.

In testimony whereof I affix my signature.

EDWARD M. ORTON.